Nov. 20, 1956

R. W. HAMPTON 2,771,550

COUNTING CIRCUITS

Filed March 9, 1953

INVENTOR.

Robert W. Hampton

United States Patent Office 2,771,550

Patented Nov. 20, 1956

2,771,550

COUNTING CIRCUITS

Robert W. Hampton, Contra Costa County, Calif., assignor to Marchant Calculators, Inc., a corporation of California Application March 9, 1953, Serial No. 340,984

15 Claims. (Cl. 250—27)

The present invention relates to calculating machines and more particularly concerns decade pulse counters for use in such machines.

A number of pulse counting circuits have been devised for use in calculating machines. One type of counting circuit comprises a plurality of stages of pulse-operated binary circuitry, each stage having a first, or "off," stable condition of operation representing the binary value 0, and a second, or "on," stable condition of operation representing the binary value 1. If several such binary stages are coupled together in cascade, they can be made to count input pulses in the binary system, such that the total number of input pulses is represented by the collective states of the stages. If "$n$" binary stages are coupled in this manner, they are capable of collectively representing $2^n$ different numeral values, as expressed in the decimal system. Each stage $n$, when it is in its "on" condition, may be said to represent the decimal value $2^{n-1}$. For example, four cascade-coupled stages are capable of collectively representing $2^4=16$ different numeral values, such as 0–15, each sixteenth count returning the circuit to its initial 0 condition. In such case, the four stages, when they are in their respective "on" conditions, always represent the respective decimal values $2^0$, $2^1$, $2^2$, and $2^3$, or 1, 2, 4 and 8. Various combinations of "on" and "off" stages are employed to represent intermediate values.

Four binary stages may be employed as a decade counter by reducing their normal sixteen-count cycle to a ten-count cycle. This is generally accomplished by modifying the circuit so that it is reset to its 0 condition on each tenth count, but executes the first nine counts in normal binary progression. Table I shows the combinations of "on" stages which represent the decimal values 0–9 in the normal binary progression of a counter having four stages A, B, C and D, representing the respective decimal values 1, 2, 4 and 8.

TABLE I

| | States | Decimal Values | | | | | | | | | |
|---|---|---|---|---|---|---|---|---|---|---|---|
| | | 0 | 1 | 2 | 3 | 4 | 5 | 6 | 7 | 8 | 9 |
| A | (1) | ---- | On | ----- | On | ----- | On | ----- | On | ----- | On |
| B | (2) | ---- | ----- | On | On | ----- | ----- | On | On | ----- | ---- |
| C | (4) | ---- | ----- | ----- | ----- | On | On | On | On | ----- | ---- |
| D | (8) | ---- | ----- | ----- | ----- | ----- | ----- | ----- | ----- | On | On |

From Table I, it is seen that when the normal binary progression is used, the decimal value 0 is represented when none of the stages is "on"; the values 1, 2, 4 and 8 are represented by one stage being on; the values 3, 5, 6 and 9 are represented by two of the stages being "on"; and the value 7 is represented by three of the stages being "on."

Normally, the pulse count information stored in such a circuit is transferred, or read out, into some device which is to use the information. It is obvious that it is more difficult to read out a numeral value represented by a combination of two electrical conditions than to read out a value represented by one electrical condition, and that it is more difficult yet to read out a value represented by a combination of three such conditions. The above described 1—2—4—8 code is therefore cumbersome for purposes of readout, since one of the digits (the digit 7) is represented by three signals.

Other four stage coded binary counters have been devised wherein the stages are permanently assigned codes, or sets of values, other than 1, 2, 4 and 8. For example, there are counting circuits based upon the codes 1—2—3—4, 1—1—2—5, 1—2—4—2, 1—2—4—5, and others. In each of these codes, the listed stage values are permanently assigned, i. e., the "on" condition of a given stage always represents the same numeral value. Also, in each of the above codes, at least one of the digits 0–9 must be represented by three or more "on" stages, as an examination of these codes will show.

There have been disclosed a few four stage decade counters using codes in which all of the digits 0–9 can be represented by combinations of no more than two "on" stages. But, in each of these circuits, the values assigned to the stages are non-permanent, i. e., a given stage may represent one numeral value in a first combination of stages and an entirely different numeral value in another such combination. The difficulty of reading out a counted value from such a circuit is obvious; either the count must be repeated from zero, or completed to ten, or else a complex sensing circuit must be provided for determining the ambiguous value of a given stage.

It has been discovered that there are binary decimal codes of the permanent value four-signal type in which no more than two signals are required to express each decimal digit 0–9. One such code is 1—2—3—6 and another is 1—2—4—7. The present invention comprises a four stage pulse counting circuit based upon the 1—2—3—6 code. A circuit based upon the code 1—2—4—7 is disclosed and claimed in the copending application Serial Number 340,983, filed on even date herewith.

It is therefore a principal object of the present invention to count impulses in accordance with a four-signal decimal code, wherein each of the four signals has a permanently assigned numeral value and wherein each decimal digit 0–9 is represented by 0, 1 or 2 signals.

It is a more particular object to provide a four stage binary counting circuit wherein each stage has an "off" condition and an "on" condition, the respective stages representing, in their "on" conditions, the decimal values 1, 2, 3 and 6.

Other objects of the invention are:

To provide a novel counting circuit.

To provide a four stage counting circuit the operation of which is based upon a novel binary-decimal counting code.

To provide a novel reset circuit for a counting circuit.

To provide a counting circuit having improved readout characteristics.

To provide a novel method for storing representations of decimal digits.

To provide a novel method for decimal counting.

The underlying principle of the present invention is therefore the coding of a four stage binary counter in such a way that each stage, when it is in its "on" condition, represents a permanently assigned value, and not more than two "on" stages are required to represent any of the decimal digits 0–9.

Other objects and principles will be apparent from the following description with reference to the drawing, in which.

CIRCUIT ELEMENTS

*Trigger circuit*

Figure 1:
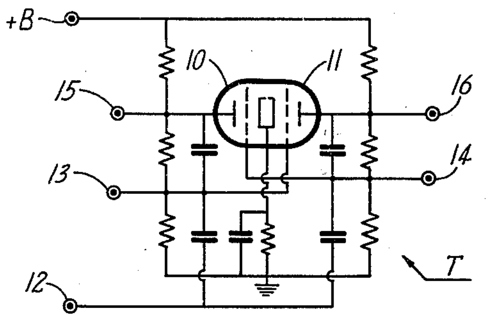
Fig. 1 is a wiring diagram of a typical trigger circuit as employed in the invention.

One of the basic elements employed in the present invention is a circuit having two stable states of operation, such, for example, as the well known Eccles-Jordan vacuum tube trigger circuit, a standard modification of which is shown at T in Fig. 1. A trigger circuit of this kind is shown and described in the copending application Serial Number 219,060, filed April 3, 1951, by G. V. Nolde et al., reference being made to the last-named application for a full description of the trigger circuit.

Briefly, the trigger circuit T comprises two amplifiers 10 and 11 which are shown, for convenience, as the two sections of a twin triode. The control grid of each amplifier is cross-coupled to the anode of the other amplifier, rendering the circuit stable in either of two conditions of operation, viz: with either section conducting and the other section nonconducting. The circuit will be described as in its "off" condition when the lefthand section 10 is conducting, and in its "on" condition when the righthand section 11 is conducting.

The trigger circuit T has an input terminal 12, hereinafter designated a "symmetrical" input, coupled to the grids of both sections. A positive pulse on terminal 12 causes the trigger circuit T to reverse its condition of operation. Alternatively, by proper choice of parameter values, the circuit may be made to respond to negative pulses only, or to both positive and negative pulses, on terminal 12.

A terminal 13, connected directly to the grid of amplifier 11, and hereinafter designated a "reset" terminal, is adapted to receive negative pulses for resetting circuit T to "off." It will be seen that a positive pulse applied directly to the grid of amplifier 10, as through a terminal 14, will also reset the circuit T to "off." In the following description, therefore, reference to a reset terminal will apply to a terminal 13 or a terminal 14, depending on the polarity of the available reset pulse.

A terminal 15, connected directly to the anode of the lefthand section 10 of circuit T is employed as a gate control terminal. The potential of terminal 15 is relatively low when section 10 is conducting (the circuit being in its "off" condition) and is relatively high when section 11 is conducting (the circuit being in its "on" condition). The high potential appearing at terminal 15 when circuit T is set to "on" may be employed for arming a gate in the manner described hereinafter.

Similarly, a terminal 16, connected to the anode of section 11, is at a relatively high potential when the trigger circuit is "off" and at a relatively low potential when the circuit is "on". Therefore, when the trigger circuit reverses from "on" to "off", there is a potential rise at terminal 16 which may be employed as a positive pulse output.

Figure 2:
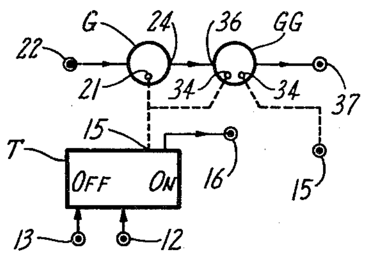
Fig. 2 is a block diagram showing the relationships between the various elements employed in the invention.

In Fig. 2, circuit T is shown as a rectangle with the symmetrical input 12 shown at the bottom center of the rectangle, the reset terminal 13 shown at the bottom left of the rectangle, and the output terminal 16 shown at the top right of the rectangle. Although the gate control terminal 15 actually is tapped from the lefthand trigger section, it is shown in Fig. 2 at the top right of the rectangle T since, as explained above, the higher control potential is available at terminal 15 for arming a gate when the trigger circuit is "on", i. e., when the righthand section is conducting.

*Single-arming gate*

Figure 3:
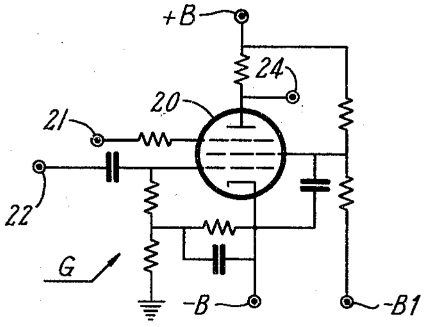
Fig. 3 is a wiring diagram of a typical single-arming gate as employed in the invention.

A second element employed in the present invention is a single-arming gate, an example of which is the well known pentode gate shown at G in Fig. 3. Gate G comprises a pentode 20 which is normally biased well below cut-off by means of a screen grid bias source —B1, but which can be "armed," or biased to slightly below cutoff, by a single arming control. The arming control for gate G comprises a terminal 21 connected to the suppressor grid of the pentode. For controlling the arming of gate G, terminal 21 is connected to the gate control terminal 15 (Figs. 1 and 2) of a trigger circuit. If the controlling trigger circuit is "off," then terminals 15 and 21 are at a relatively low potential, maintaining tube 20 biased well below cutoff so that gate G is closed, or unarmed. On the other hand, if the controlling trigger circuit is "on," terminals 15 and 21 are at a relatively high potential, biasing tube 20 to slightly below cutoff, in which condition gate G is armed.

Gate G is interrogated through a terminal 22 which is coupled to the control grid of tube 20. A positive pulse on terminal 22 when gate G is unarmed, or closed, does not raise the bias of tube 20 above cutoff. However, if a positive pulse is applied to terminal 22 when gate G is armed, the pulse is amplified, and an output pulse appears on an output terminal 24.

In Fig. 2, gate G is shown as a circle having within it a smaller circle representing the arming terminal 21 which is connected through a control lead to the gate control terminal 15 of a trigger circuit. (All control leads are shown as broken lines.) The input terminal 22 is shown on the lefthand side of gate G, while the output terminal 24 is shown on the righthand side of the gate.

*Double-arming gate*

Figure 4:
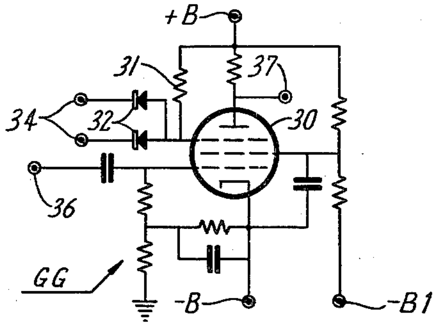
Fig. 4 is a wiring diagram of a typical double-arming gate as employed in the invention.

A third element employed in the present invention is a double-arming gate, an example of which is the pentode gate GG shown in Fig. 4. Gate GG comprises a pentode 30 which is normally biased well below cutoff by means of a source of potential —B1 connected to the screen grid. The suppressor grid is connected through each of a pair of rectifiers 32 to a respective arming terminal 34. Each arming terminal 34 is connected to a respective gate control terminal 15 (Figs. 1 and 2) of a trigger circuit. The suppressor grid is also connected through a resistor 31 to the anode potential source +B which is at a potential at least as high as the higher of the two potentials of a gate control terminal 15. It will be apparent that if either or both controlling trigger circuits are in the "off" condition, then one or both arming terminals are at the lower control potential, and current flows from +B to the low potential terminal(s) 34 through resistor 31 and the related rectifier(s) 32. The drop across resistor 31 therefore maintains the suppressor grid of pentode 30 at the lower control potential, and the pentode remains biased well below cutoff, so that gate GG is closed, or unarmed. If both terminals 34 are at the higher control potential, i. e., if both controlling trigger circuits are "on," the reduced potential drop across resistor 31 raises the suppressor grid potential to the higher control level, thereby raising the bias of tube 30 to slightly below cutoff, in which condition gate GG is armed.

Gate GG is interrogated through a terminal 36 which is coupled to the control grid of pentode 30. A positive pulse impressed on terminal 36 when gate GG is unarmed, or closed, does not raise the bias of tube 30 above cutoff. However, if a positive pulse is applied to terminal 36 when gate GG is armed, the pulse is amplified, and an output pulse appears on an output terminal 37.

In Fig. 2, gate GG is shown as a circle having within it two smaller circles representing the arming terminals 34, each of which is connected through a control lead to the gate control terminal 15 of a respective trigger circuit.

The input terminal 36 is shown on the lefthand side of gate GG, while the output terminal 37 is shown on the righthand side of the gate.

*Counting circuit*

Figure 5:
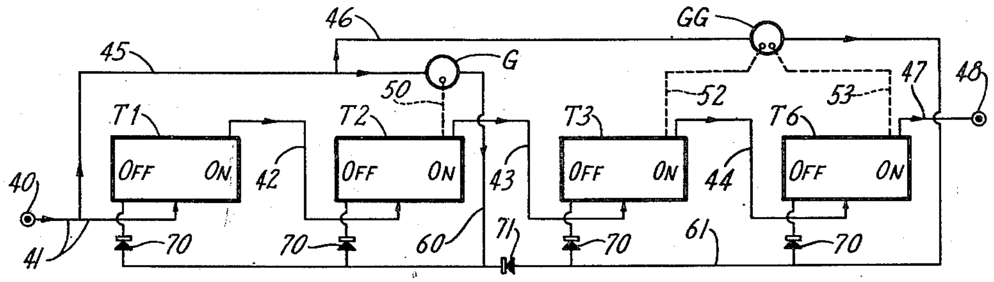
Fig. 5 is a block diagram of the counting circuit.

Referring to Fig. 5, the present counting circuit includes four binary counting stages T1, T2, T3 and T6, each of which comprises a trigger circuit of the type shown in Fig. 1. Each of the four stages is initially in its "off" condition, representing the decimal value 0. An input terminal 40 receives positive pulses that are to be counted and is connected by a lead 41 to the symmetrical input of the first stage T1. The output terminal of T1 is connected by a lead 42 to the symmetrical input of the second stage T2. Similarly, the output terminals of the second and third stages T2 and T3 are connected by two leads 43 and 44 to the respective symmetrical input terminals of the third and fourth stages T3 and T6. The output terminal of T6 is connected to a circuit output terminal, as described hereinafter.

The values of the trigger circuit parameters are selected, as previously described, such that each stage responds at its symmetrical input to positive pulses only. Each input pulse on terminal 40 reverses the condition of operation of T1, in the manner described above. The first input pulse on terminal 40 sets T1 to "on," and the second input pulse resets T1 to "off." It is recalled that when a trigger stage is reversed from "on" to "off," a positive pulse appears at its output terminal. Therefore, when T1 is reset to "off" in response to the second input pulse, a positive pulse is coupled from T1 to T2 by lead 42, setting T2 to "on," so that each second input pulse causes T2 to be reversed. By extending the normal binary progression, each fourth input would cause T3 to be reversed and each eighth input pulse would cause T6 to be reversed. Therefore, if the four stages were permitted to count in their unmodified binary progression, the first nine counts would occur with the stages in their respective conditions of operation shown in Table I, supra, the "on" conditions of the stages then representing the respective decimal values 1, 2, 4, and 8.

In the present circuit, however, the normal binary progression is modified to change the "on" values of the third and fourth stages from 4 and 8, respectively, to 3 and 6, respectively, and to cause the entire counting circuit to be reset to 0 (all stages "off") upon completion of each tenth count. The circuit modifications are as follows.

A single-arming gate G, of the type shown in Fig. 3, is interrogated by each input pulse through terminal 40, lead 41 and a lead 45. Output pulses from gate G are conducted by a lead 60 to a reset buss 61 which is connected to the reset terminal of each stage through a respective decoupling rectifier 70. (All rectifiers in Fig. 5 are shown, for purposes of illustration, with arrows pointing in the described direction of pulse flow, regardless of pulse polarity.) A rectifier 71 on the reset buss 61 prevents any pulse output from gate G from resetting T3 or T6. Gate G is armed through a control lead 50 which is connected to the gate control terminal of T2; therefore, gate G is armed when T2 is "on."

The first two pulses introduced through terminal 40 are counted in regular binary progression, so that after two counts stages T1, T2, T3 and T6 stand at "off," "on," "off" and "off," respectively, and gate G is armed. The third input pulse sets T1 to "on" but is passed through gate G to lead 60 and buss 61, thereby resetting T1 and T2 to "off." If there is any interference at T1 between the set pulse on lead 41 and the reset pulse on buss 61, the reset pulse prevails since it is amplified (by gate G) and applied asymmetrically to T1; therefore T1 is invariably reset to "off" in response to the third count. When T2 is reset to "off" during the third count, the positive pulse appearing at its output terminal sets T3 to "on" through lead 43. Therefore, T3 is the only stage which is "on" after completion of the third count. The conditions of the respective stages at the completion of each count are shown in Table II, below.

TABLE II

| Stages | Decimal Values | | | | | | | | | |
|---|---|---|---|---|---|---|---|---|---|---|
| | 0 | 1 | 2 | 3 | 4 | 5 | 6 | 7 | 8 | 9 |
| T1 | ---- | On | ---- | ---- | On | ---- | ---- | On | ---- | ---- |
| T2 | ---- | ---- | On | ---- | ---- | On | ---- | ---- | On | ---- |
| T3 | ---- | ---- | ---- | On | On | On | ---- | ---- | ---- | On |
| T6 | ---- | ---- | ---- | ---- | ---- | ---- | On | On | On | On |

It will be seen that the reset pulse need not be transmitted to both stages T1 and T2 on the third count in order to perform the present coding. For example, if the reset pulse on lead 60 is delayed slightly, by any appropiate delay circuit, then T1 will be fully set to "on" by the third input pulse at terminal 40. In such case, the reset pulse on buss 61 may be applied only to T1, causing T1 and T2 to be reversed to "off" in sequence, thereby reversing T3 to "on."

The fourth input pulse sets T1 to "on," and the fifth pulse resets T1 to "off," thereby setting T2 to "on" and arming gate G. The sixth input pulse sets T1 to "on," but is passed through gate G, resetting T1 and T2 to "off." When T2 is reversed from "on" to "off" during the sixth count, its output pulse on lead 43 reverses T3 from "on" to "off," and the resulting output pulse on lead 44 sets T6 to "on." Therefore, when the sixth count is completed, T6 alone is "on," as shown in Table II.

The seventh, eighth and ninth counts are performed in the same manner as the first, second and third counts, and result in T3 and T6 being "on" at the end of nine counts.

It is recalled that the entire circuit is reset to 0 in response to the tenth count. This resetting is accomplished as follows.

A double-arming gate GG, of the type shown in Fig. 4, is interrogated by each input pulse through terminal 40, leads 41 and 45, and a lead 46. The output from gate GG constitutes the reset buss 61. Gate GG is armed through two control leads 52 and 53 connected to the respective arming terminals of T3 and T6. Gate GG is therefore armed after completion of the ninth count when both T3 and T6 are "on," as shown in Table II, and the tenth input pulse is passed by gate GG to buss 61, thereby resetting all four stages to "off."

It will be aparent that the reset pulse need not be transmitted to all four stages on the tenth count in order to reset the entire circuit to zero. For example, the reset pulse may be applied only to T1 and T3. This prevents T1 from reversing to "on" and reverses T3 to "off," thereby reversing T6 to "off." However, by applying the reset pulse to all four stages, positive action is insured.

When T6 is reversed from "on" to "off" in response to the tenth count, the positive pulse on its output terminal is conducted by a lead 47 to a circuit output terminal 48. Therefore, a positive pulse appears at terminal 48 in response to each tenth count, and may be employed, for example, to operate a second decade counting circuit, or to perform a control function.

It will be seen from the foregoing description, with reference to Table II, that each decimal digit 0–9 is represented by the "on" condition of zero, one or two counting stages, and that no digit is represented by a combination of more than two "on" stages.

I claim:

1. The combination of: four stages of circuitry, each stage having a first and a second stable condition of operation and each stage being initially in its first condition of operation; means for applying input signals to the first stage; means interconnecting said stages for setting a respective unique combination of said stages to their respective second conditions of operation in response to each number, 0–9, of applied signals; a circuit, including said interconnecting means, for preventing more than two of said stages from standing in their respective second conditions of operation in response to the application of any number, 0–9, of input signals to said first stage; a circuit, including said interconnecting means, for establishing a permanent relationship between the second condition of operation of each of said stages and a single number of input signals; and a reset circuit comprising normally disabled means connected to the third and fourth stages and controlled thereby, when the third and fourth stages are concurrently in respective predetermined conditions of operation, for resetting all four stages to their respective first conditions of operation.

2. The combination defined in claim 1, wherein each stage comprises a vacuum tube trigger circuit.

3. The combination of: four stages of circuitry, each stage having a first and a second stable state of operation, and each stage being initially in its first state; means for applying input pulses to the first stage; first interconnections between the stages for causing a unique combination of from zero to three stages to be set to their respective second states in response to each number, 0–9, of applied pulses; additional interconnections between the stages for modifying certain ones of said combinations for limiting the number of stages in their respective second states to a maximum of two in any combination; a circuit, including said additional interconnections, for establishing an invariable relationship between the second state of each stage and a single number of applied pulses, throughout all of the modified and unmodified combinations; and a reset circuit comprising normally disabled means connected to the third and fourth stages and controlled thereby, when the third and fourth stages are concurrently in respective predetermined states of operation, for causing all four stages to be reset to their respective first states of operation.

4. The combination defined in claim 3, wherein each stage comprises a vacuum tube trigger circuit.

5. In a counting circuit, the combination of: four counting stages, each stage having a first and a second stable state of operation, and each stage being initially in its first state; an input pulse source connected to the first stage; means coupling the stages in cascade and operable, in response to the input pulses, for causing the stages to alternate between their two states in binary progression, in which progression the second states of the first and second stages invariably represent the occurrence of 1 and 2 input pulses, respectively; means for modifying the coupling means for causing the second states of the third and fourth stages to invariably represent the occurrences of 3 and 6 input pulses, respectively, said modifying means including interstage connections; and a circuit, including said modifying means, for maintaining at least two of said stages in their respective first states of operation in representing any number, 0 to 9, of input pulses applied to said first stage.

6. The counting circuit defined in claim 5, wherein each stage comprises a vacuum tube trigger circuit.

7. In the counting circuit defined in claim 5, a circuit interconnecting certain ones of said stages and operable in response to the occurrence of a tenth input pulse for resetting all four stages to their respective first states of operation.

8. The counting circuit defined in claim 5, wherein the modifying means includes a gate.

9. In a counting circuit comprising four stages of circuitry, each stage having a first and a second stable state of operation, the combination of: means coupling said stages in cascade for reversing the state of each stage except the first in response to the reversal of the preceding stage from its second to its first state; an input pulse source connected to the first stage for reversing the state of the first stage in response to the receipt of each input pulse; and a normally disabled means controlled by one stage and enabled thereby, when the counting circuit is in a predetermined condition of operation, for resetting only the first two stages to their respective first states of operation in response to the occurrence of a third input pulse.

10. In a counting circuit comprising first, second, third, and fourth stages of circuitry, each stage having a first and a second stable state of operation; the combination of, means coupling said stages in cascade for reversing the state of each stage except the first in response to the reversal of the preceding stage from its second to its first state, an input pulse source connected to the first stage for reversing the state of the first stage in response to the receipt of each pulse, a gate controlled by the second stage and armed thereby when the second stage is in its second state of operation, an input connection from the pulse source to the gate, an output circuit from the gate for receiving pulses from said source when the gate is armed, and connections from said output circuit to the first and second stages for resetting only the first and second stages to their respective first states of operation in response to each pulse output from the gate.

11. In the counting circuit defined in claim 10, a circuit interconnecting certain ones of said stages and operable in response to the occurrence of a tenth input pulse for resetting all four stages to their respective first states of operation.

12. In a counting circuit comprising first, second, third and fourth stages of circuitry, each stage having a first and a second stable state of operation; the combination of, means coupling said stages in cascade for reversing the state of each stage except the first in response to the reversal of the preceding stage from its second to its first state, an input pulse source connected to the first stage for reversing the state of the first stage in response to the receipt of each pulse, a first gate controlled by the second stage and armed when the second stage is in its second state of operation, a second gate controlled jointly by the third and fourth stages and armed when the third and fourth stages are concurrently in their respective second states of operation, a respective input connection from the pulse source to each of the first and second gates, a respective output circuit from each of the first and second gates for receiving pulses from said source when the related gate is armed, connections from the output circuit of the first gate to the first two stages for resetting the latter to their respective first states of operation in response to each pulse output from the first gate, and connections from the output circuit of the second gate to all four stages for resetting the latter to their respective first states of operation in response to each pulse output from the second gate.

13. The combination of: first, second, third and fourth stages of circuitry, each stage having a first and a second stable condition of operation, and each stage being initially in its first condition of operation; means for applying input pulses to a said first stage; circuits interconnecting the stages for causing a unique pattern of from zero to two stages to be set to their respective second conditions of operation in response to each of a series of input pulses; and a reset circuit controlled jointly by the third and fourth stages and enabled by a first occurrence of the concurrent second condition of operation of the third and fourth stages for resetting all four stages to their first condition of operation in response to the occurrence of a next input pulse.

14. The combination defined in claim 13, wherein each stage comprises a vacuum tube trigger circuit.

15. The combination defined in claim 13, wherein the reset circuit includes a gate.

References Cited in the file of this patent

UNITED STATES PATENTS

| | | |
|---|---|---|
| 2,521,350 | Dickinson | Sept. 5, 1950 |
| 2,521,774 | Bliss | Sept. 12, 1950 |
| 2,567,944 | Krause et al. | Sept. 18, 1951 |
| 2,574,145 | Freas | Nov. 6, 1951 |
| 2,604,263 | MacSorley | July 22, 1952 |
| 2,614,169 | Cohen et al. | Oct. 14, 1952 |
| 2,731,201 | Harper | Jan. 17, 1956 |